United States Patent
Emmons, Jr. et al.

(10) Patent No.: US 6,847,622 B1
(45) Date of Patent: Jan. 25, 2005

(54) METHODS AND APPARATUS FOR PROVIDING MULTIPLE WIRELESS COMMUNICATION SERVICES HAVING DIFFERENT BIT RATES

(75) Inventors: Thomas Peter Emmons, Jr., Mesa, AZ (US); James Startup, Tempe, AZ (US); Robert Anthony Peters, Sunnyvale, CA (US)

(73) Assignee: Motorola, Inc., Schaumburg, IL (US)

( * ) Notice: Subject to any disclaimer, the term of this patent is extended or adjusted under 35 U.S.C. 154(b) by 763 days.

(21) Appl. No.: 09/713,457

(22) Filed: Nov. 15, 2000

(51) Int. Cl.[7] .............................................. H04B 7/216
(52) U.S. Cl. ..................................... 370/335; 370/342
(58) Field of Search ............................... 370/320, 335, 370/342, 441, 319, 321, 326, 330, 336, 337, 343, 344, 347, 442, 458, 468, 535, 536, 537, 538, 539, 540, 541, 542, 545; 375/130, 219, 272, 295, 316, 334, 135, 136, 131

(56) References Cited

U.S. PATENT DOCUMENTS

| | | | | |
|---|---|---|---|---|
| 5,469,468 A | * | 11/1995 | Schilling | 375/130 |
| 5,729,535 A | * | 3/1998 | Rostoker et al. | 370/328 |
| 5,805,581 A | * | 9/1998 | Uchida et al. | 370/335 |
| 6,044,073 A | * | 3/2000 | Seshadri et al. | 370/342 |
| 6,130,884 A | * | 10/2000 | Sato | 370/335 |
| 6,154,456 A | * | 11/2000 | Rakib et al. | 370/342 |
| 6,208,624 B1 | * | 3/2001 | Tanno et al. | 370/280 |
| 6,289,009 B1 | * | 9/2001 | Sato | 370/342 |
| 6,510,148 B1 | * | 1/2003 | Honkasalo | 370/342 |
| 6,571,369 B1 | * | 5/2003 | Li | 714/792 |
| 6,674,741 B1 | * | 1/2004 | Rasanen | 370/347 |
| 6,735,189 B1 | * | 5/2004 | Kukla et al. | 370/342 |
| 2001/0036174 A1 | * | 11/2001 | Herring | 370/352 |
| 2003/0013447 A1 | * | 1/2003 | Persson et al. | 455/437 |

* cited by examiner

*Primary Examiner*—Frank Duong
*Assistant Examiner*—Michael J. Moore, Jr.
(74) *Attorney, Agent, or Firm*—Frank J. Bogacz

(57) ABSTRACT

A communication system provides multiple wireless services, each potentially having a different information bit rate. A transmitter (400, FIG. 4) encodes (504, FIG. 5) relatively low rate data (430, FIG. 4) using code division multiple access (CDMA). The resulting spread data stream(s) (436, FIG. 4) are multiplexed and modulated (506, 508, FIG. 5) along with relatively high information rate, non-encoded data streams (440, FIG. 4) using a time division multiple access/frequency division multiple access (TDMA/FDMA) protocol. In other embodiments, the methods and apparatus of the present invention can be used in a CDMA only system, or in a system using a time division multiplexing/FDMA and time division multiplexing/CDMA. In one embodiment, the spread data streams are transmitted in timeslots (211–214, FIG. 2) and frequencies (201–204, FIG. 2) that are interspersed between timeslots and frequencies used for the high rate data. A receiver (600, FIG. 6) performs complementary demodulation (704, FIG. 7), demultiplexing (706, FIG. 7), and decoding (710, FIG. 7).

11 Claims, 4 Drawing Sheets

-PRIOR ART-

METHODS AND APPARATUS FOR PROVIDING MULTIPLE WIRELESS COMMUNICATION SERVICES HAVING DIFFERENT BIT RATES

TECHNICAL FIELD

The invention relates generally to wireless communications and, more specifically, to providing wireless services having different information bit rates in a system that uses multiplexing and multiple access techniques.

BACKGROUND OF THE INVENTION

Some wireless communications systems provide users with multiple types of services. For example, a particular system might provide voice, paging, and other services to its users.

The data and communications channels required for various types of services often have different characteristics. For example, voice data and paging data are generated at different bit rates, and voice and data channels may have different transmit link margin requirements. A voice data rate for a single channel might use a bandwidth of 50 kilohertz (kHz) and require a high link margin to ensure good quality service. On the other hand, paging data is more bursty in nature, and it might occur at a data rate that is tenths or hundredths the rate of voice data. In addition, a paging channel typically requires a substantially higher link margin than a voice channel, to ensure that the paging signals are likely to be received when the user is in a building or in the presence of other obstructions.

In order to provide services with different bit rates and link margin requirements, some prior art systems allocate separate spectral bands to each type of service. FIG. 1 illustrates an example of a spectral allocation diagram in accordance with the prior art. The example spectrum includes six frequencies 101, 102, 103, 104, 105, and 106. At each frequency 101–106, data can be transmitted in one of four timeslots 111, 112, 113, and 114. Accordingly, the system uses a combination of FDMA and TDMA to transmit data on different channels.

Because in some systems the paging data channels have a higher link margin requirement than the voice channels, such systems increase the transmission power when transmitting paging data. Accordingly, it is necessary to allocate separate timeslots and frequencies to the voice data and the paging data. This is shown in FIG. 1, where the voice channels 120 are allocated to timeslots 111–113 and frequencies 101–104. The paging channels 130 are allocated to timeslot 114 and frequencies 105 and 106. The transmission power is increased by devoting all the carrier energy to a single one of two frequencies 105 or 106 in time slot 114 to meet the higher paging link margin requirements, during which time slot the carrier energy is not available for transmitting on the other carrier frequencies 101–104.

Because the voice and paging channels do not overlap, a substantial amount of the spectrum, represented by cross-hatched area 140, is not useable. This technique of separating the voice and paging data in frequency and time results in an inefficient use of available spectrum. In addition, only a single paging channel can be placed in each of the available frequencies. Thus, each of the relatively low rate paging data channels uses substantially more spectrum than its data rate warrants.

What are needed are methods and apparatus for a communications system to provide multiple wireless communications services, each of which has a different bit rate and/or link margin requirement. Further needed are methods and apparatus for providing different bit rate services, where available spectrum is used in an efficient manner. Additionally needed are methods and apparatus that use a common transmission bit rate, thus potentially simplifying the design of transmit and receive equipment.

DETAILED DESCRIPTION

Figure 1:
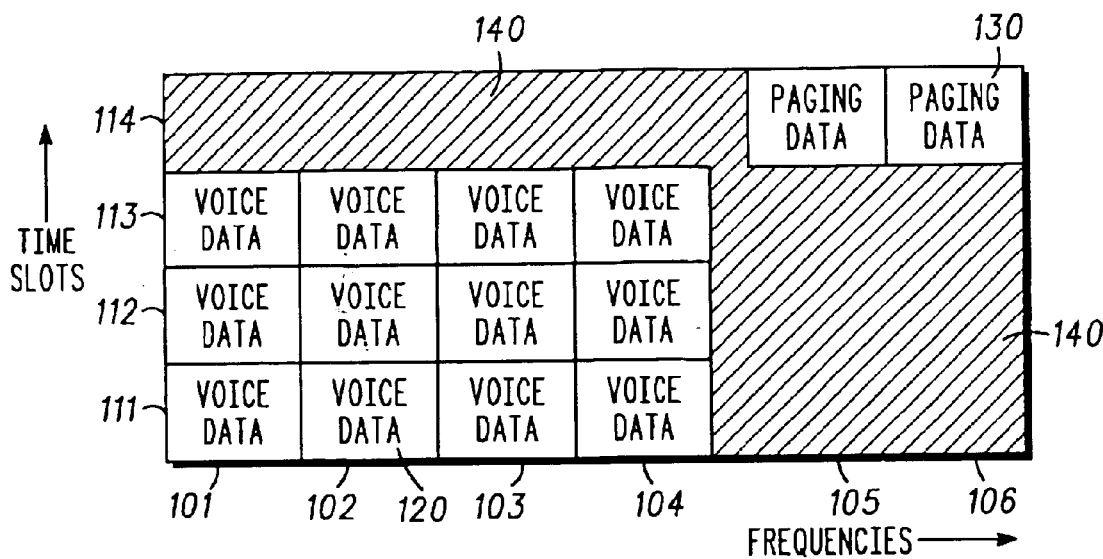
FIG. 1 illustrates an example of a spectral allocation diagram in accordance with the prior art.

Embodiments of the present invention provide methods and apparatus for a communications system to provide multiple wireless communications services, each of which could have a different bit rate and/or link margin requirement. Further provided are methods and apparatus for a system to provide different bit rate services, where available spectrum is used in an efficient manner.

In one embodiment, relatively high rate data (e.g., voice data) is multiplexed using a time division multiple access/frequency division multiple access (TDMA/FDMA) protocol. Relatively low rate data (e.g., paging data) is encoded using code division multiple access (CDMA), and it is then multiplexed along with the high rate data using the TDMA/FDMA protocol. Rather than increasing the transmission power necessary to achieve the required link margin for the low rate data, as is done in the prior art, the method and apparatus of the present invention effectively reduce the transmission rate of the low rate data by spreading the data (i.e., using CDMA). This reduction in the effective transmission rate yields a higher link margin. Thus, when the low rate data is paging data, a higher link margin can be achieved without increasing the transmission power for the paging data. Further, the transmission bit rate can be the same for both data rates, in one embodiment, simplifying the design of communications equipment.

Accordingly, the paging channels can be transmitted within the same frequency bands as the voice channels, resulting in a more efficient use of available spectrum than is possible using prior art systems. The methods and apparatus of the present invention enable low rate data to be transmitted in timeslots and at frequencies that are interspersed between timeslots and frequencies used for higher rate data. Unlike in the prior art, the different bit rate channels do not need to be separated within the spectral allocation. Since the entire spectrum can be used, a much more efficient use of available spectral resources is achievable.

In various embodiments, the methods and apparatus of the present invention permit the use of a common transmission bit rate for both high and low information bit rate signals with greatly differing link margins. A common bit rate can allow a more efficient time division multiplexing (TDM) protocol to be used, in one embodiment, rather than using a TDMA protocol. The common bit rate and frequencies eliminate the need for burst modes, further increasing the efficiency of various embodiments of the methods and apparatus of the present invention. In addition, the method and apparatus of the present invention allow changes in information bit rate link margin to be quickly and easily made in order to optimize the link.

Although the description, below, is described as using TDMA/FDMA and CDMA protocols, the methods and apparatus of the various embodiments could be implemented in systems that use various multiplexing and multiple access techniques. For example, the methods and apparatus could be used in systems using various combinations of time division multiplexing, time division multiple access, code division multiplexing (CDM), code division multiple access, frequency division multiplexing (FDM), and frequency division multiple access protocols.

Although the terms "high rate" and "low rate" are used in the description, these terms are only meant to indicate the relative bit rates of the different types of data streams with respect to each other. The terms are not meant to imply that the present invention is applicable only to "high rate" and "low rate" data, as those terns may be generally understood in the art. Therefore, the terms "high rate" and "low rate" should not be construed to limit the various embodiments of the present invention to particular bit rate ranges. Instead, the various embodiments of the present invention could be used to process data in any bit rate ranges in which CDMA, FDMA, and TDMA techniques are useable.

Figure 2:
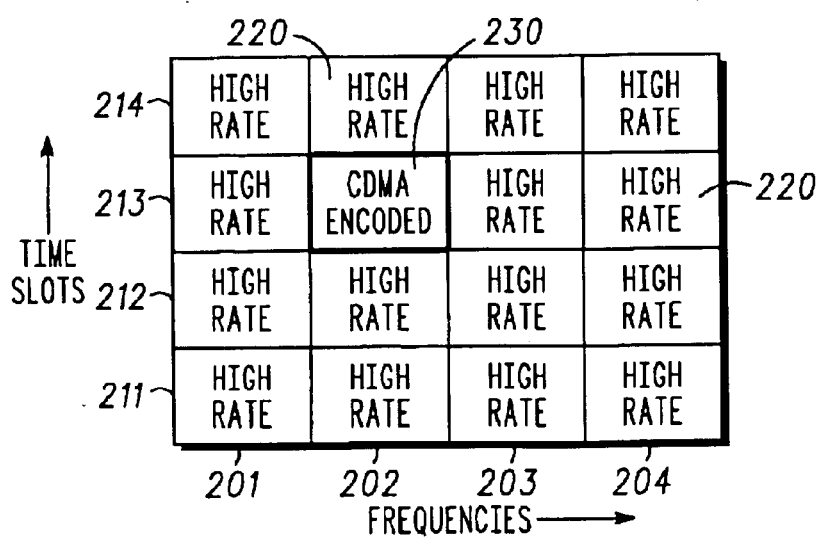
FIG. 2 illustrates an example of a spectral allocation diagram in accordance with one embodiment of the present invention.

FIG. 2 illustrates an example of a spectral allocation diagram in accordance with one embodiment of the present invention. The available spectrum is divided into a matrix 200, which includes four frequencies 201, 202, 203, and 204 and four timeslots 211, 212, 213, and 214. The set of data transmitted or received during the four timeslots 211–214 and at the four frequencies 201–204 is referred to as a frame of data.

Some frequency/timeslots 220 are allocated to relatively high bit rate data (e.g., voice). The data transmitted during these slots is multiplexed using a TDMA/FDMA protocol, in one embodiment. One or more other frequency/timeslots 230 are allocated to relatively low bit rate data (e.g., paging), and the data transmitted during these slots is encoded using CDMA and multiplexed using the TDMA/FDMA protocol, in one embodiment. During a timeslot 230 that uses CDMA encoding, multiple channels of low rate data can be encoded together.

A CDMA signal is generated by spreading data over some frequency range. In one embodiment, the low rate data is spread using a chip rate that results in a transmission bit stream having the same rate as the relatively high bit rate data. This results in a substantially higher link margin for the low rate data than would be achievable using a TDMA/FDMA protocol. Accordingly, the low rate data, when transmitted at the same power level as the TDMA/FDMA multiplexed high rate data, will effectively have a higher link margin than the high rate data.

Thus, even in a system where the link margin requirements for the low rate data are higher than the link margin requirements for the high rate data, both types of data can be transmitted at the same power level, using the methods and apparatus of the present invention. Since they can be transmitted at the sane power level, it is practical to transmit the low and high rate data within the same band (i.e., both types of multiplexed data can share the same frequencies). This is illustrated in FIG. 2, which shows the low rate, CDMA encoded slot 230 being transmitted at the same frequency 202 as the high rate slots 220, although they are transmitted during different timeslots at that frequency.

One advantage to the present invention is that the entire spectrum available to a particular system can be used, since the high rate and low rate data channels do not have to be transmitted in separate frequency bands. In addition, the high rate and low rate data can be transmitted in the same timeslots, when they are transmitted at different frequencies. Thus, the present invention results in more efficient use of available spectrum. Another advantage to the present invention is that multiple low rate channels can be multiplexed into the same CDMA slot. Therefore, unlike in the prior art systems, multiple paging signals can be transmitted within a particular slot.

Although FIG. 2 illustrates four frequencies 201–204 and four timeslots 211–214, resulting in sixteen frequency/timeslots, more or fewer frequencies and timeslots could be used in other embodiments, including a system using only a single frequency. In addition, although the frequencies are shown to be contiguous, the available spectrum could be divided into segments, where portions of the available spectrum are located in one or more different frequency bands.

Although only a single CDMA encoded slot 230 is shown along with fifteen high rate slots 220, more frequency/timeslots could be allocated to CDMA encoded data. Further, the positioning of the CDMA encoded slot 230 (or slots) within the TDMA/FDMA matrix 200 could be different than illustrated in FIG. 2.

The methods and apparatus of the present invention can be implemented in a variety of different wireless communication systems, such as ground-based, satellite-based, and hybrid systems that use cellular, broadcast, and/or directed communications.

Figure 3:
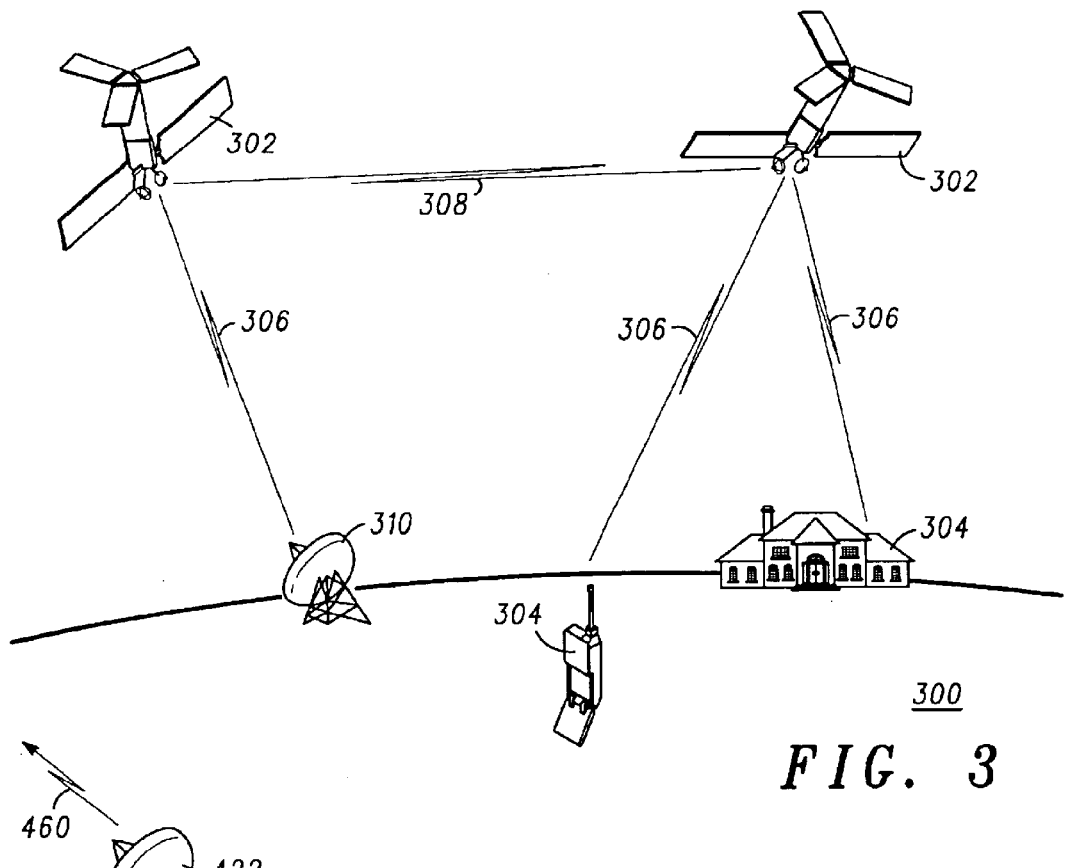
FIG. 3 illustrates a simplified block diagram of a wireless communication system in accordance with one embodiment of the present invention.

FIG. 3 illustrates a simplified block diagram of a wireless communication system 300 in accordance with one embodiment of the present invention. System 300 includes one or more satellites 302, communication equipment 304, and system control center 310. Satellites 302 communicate with communication equipment 304 and/or control center 310 via one-way or bi-directional, wireless communications links 306. In addition, satellites 302 could communicate with each other over a wireless crosslink 308.

Communication equipment 304 are fixed or mobile communication devices that send radio frequency (RF) data to and receive RF data from satellites 302 or other nodes. Equipment 304 can be, for example, cellular telephones, pagers, personal communication systems (PCS), computers, radios, or other communications devices. In addition, a particular piece of communication equipment 304 can have capabilities of more than one of the types of equipment listed in the previous sentence. Accordingly, communication equipment 304 can receive and process data that is generated at one or more different bit rates. In addition, communication equipment 304 can produce and/or transmit data at one or more different information bit rates. Although RF links are shown in FIG. 3, the methods and apparatus of the present invention are also applicable to other transmission media, such as infrared or optical, for example.

Communication equipment 304 sends and/or receives RF signals from satellites 302 or other system nodes. In one embodiment, each type of communication equipment 304 uses TDMA/FDMA and/or CDMA protocols for processing the data, although some types of equipment could use both protocols.

During an acquisition process with system 300, each piece of communication equipment 304 is allocated a particular frequency and timeslot within the system's available spectrum. Therefore, both system 300 and communication equipment 304 know when and at what frequency to transmit data or search for data. In one embodiment, the frequency and timeslot allocations are determined by a system control center 310, which communicates the information to satellites 302 and communication equipment 304. In other embodiments, the allocations could be determined by a distributed control function, or they could be entirely or partially determined by satellites 302.

Satellites 302 represent nodes that receive data from communication equipment 304 and from other sources (e.g., system control facilities, telephone networks, and computer networks). Satellites 302 then send the data toward its destination without substantial processing, or satellites 302 may demodulate and demultiplex a data stream, and then re-multiplex, re-modulate, and route the data toward the appropriate destination. Satellites 302 process the data in a manner that depends on what type of data is allocated to which timeslots and frequencies, as will be described in more detail below.

Although satellites 302 are used as routing nodes in system 300, other types of nodes could also be used to route data. For example, in a conventional cellular system, cellular base stations and antennas (not shown) could be used to send, receive, and route data to and from communication equipment 304. Various other types of routing nodes also could be used in other types of communication systems.

Regardless of the type of routing node used in system 300, each routing node includes a transmitter and a receiver, in one embodiment. The transmitter and receiver are capable of processing RF data using both TDMA/FDMA and CDMA techniques. Following the description below of a transmitter apparatus and method in conjunction with FIGS. 4 and 5, a receiver apparatus and method will be described in conjunction with FIGS. 6 and 7.

Figure 4:
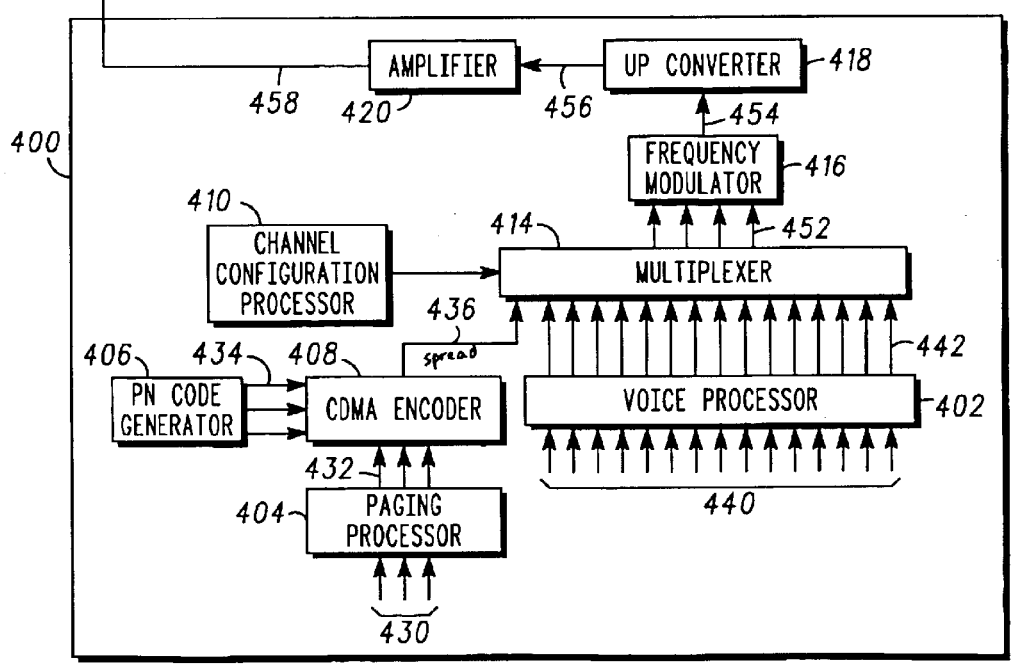
FIG. 4 illustrates a simplified block diagram of a transmitter in accordance with one embodiment of the present invention.

FIG. 4 illustrates a simplified block diagram of a transmitter 400 in accordance with one embodiment of the present invention. Transmitter 400 resides on a system node responsible for multiplexing multiple data streams. Thus, for example, transmitter 400 could be located onboard a satellite (e.g., satellite 302, FIG. 3), within a cellular base station, or in another similarly functioning type of system node. In other embodiments, transmitter 400 could reside in a communication unit (e.g., communication equipment 304, FIG. 3) or in another system component.

In one embodiment, transmitter 400 includes voice processor 402, paging processor 404, pseudo noise (PN) code generator 406, CDMA encoder 408, channel configuration processor 410, multiplexer 414, frequency modulator 416, upconverter 418, amplifier 420, and antenna 422. Transmitter 400 receives one or more data streams 430, 440 from one or more sources, such as communication equipment 304 (FIG. 3) or other satellites 302. Each data stream can include voice data, paging data, short message service (SMS) data, or virtually any other type of data. To simplify the description below, data streams 430 will be described as carrying paging data, and data streams 440 will be described as carrying voice data that is typically received at a higher data rate than the paging data. For example, voice data could be received at 50 kilobits/second, and paging data could be received at 500 bits/second, although they could be received at other rates, as well.

Three paging data streams 430 and fifteen voice data streams 440 are shown in FIG. 4 for illustrative purposes. In other embodiments, more or fewer paging and/or voice data streams could be received by transmitter 400. In one embodiment, transmitter 400 encodes paging data streams 430 using a CDMA protocol. Then, both the encoded paging data and the voice data streams are multiplexed using a TDMA/FDMA protocol, as will be explained below.

Voice processor 402 prepares the received voice data streams 440 for multiplexing. Depending on the format of the voice data when it is received by transmitter 400, this could involve amplification, downconversion, demultiplexing, demodulation, reformatting, and/or modulation. The resulting processed voice data streams 442 are sent to multiplexer 414.

Although FIG. 4 shows fifteen processed voice data streams 442 being sent to multiplexer 414, more or fewer voice streams 442 could be sent to multiplexer 414. In one embodiment, the number of processed voice data streams 442 corresponds to the number of time and frequency slots (e.g., slot 220, FIG. 2) allocated to voice data within the system's allocated spectrum. Accordingly, for example, if nine slots are allocated to voice data, then voice processor 402 would produce nine voice data streams 442. In alternate embodiments, the ratio between voice data streams 442 and slots allocated to voice data could be other than 1:1.

As mentioned previously, transmitter 400 also receives paging data streams 430. Paging processor 404 prepares the paging data streams 430 for encoding. Depending on the format of the paging data when it is received by transmitter 400, this could involve amplification, downconversion, demultiplexing, decoding, demodulation, reformatting, and/or modulation. The resulting processed paging data streams 432 are sent to CDMA encoder 408.

CDMA encoder 408 receives the processed paging data streams 432, and it applies an orthogonal spreading code 434 to each of the processed paging data streams 432. The spreading code 434 for each stream 432 is generated by PN code generator 406, in one embodiment, using techniques that are well known to those of skill in the art. CDMA encoder 408 then sums the spread signals, resulting in one or more spread data streams 436 that include the spread data. The spread data streams 436 are sent to multiplexer 414, which will be described below.

In one embodiment, the chip rate of the spreading code is chosen to yield a data stream 436 having the same data rate as the voice data 442. Thus, for example, if the voice data rate is 50 kilobits/second, and the paging data rate is 500 bits per second, the chip rate would be chosen to yield a paging data rate that is 100 times faster than the paging data rate, which is equal to the voice channel rate.

In one embodiment, the chip rate is the same for all relatively low bit rate data. In another embodiment, the chip rate could be different for various channels. As the chip rate increases, the link margin increases and the data rate decreases. Thus, for example, multiple chip rates could be used for various channels, depending on whether a higher link margin or a higher data rate is desired. In one embodiment, the user could select the desired chip rate (or data rate or link margin) during acquisition or setup of the channel. In an alternate embodiment, the chip rate could be determined or pre-set by the communication system.

The selected chip rate is proportional to the decrease in the effective transmission rate for the spread data. For example, a chip rate of 64 chips for each bit could be chosen. In such a case, the effective transmission rate will be decreased by a factor of 64.

Although FIG. 4 shows three processed paging data streams 432 being combined into one spread data stream 436, more or fewer paging streams 432 could be spread and combined into one or more spread data streams 436. In one embodiment, the number of spread data streams 436 corresponds to the number of slots (e.g., slot 230, FIG. 2) allocated to CDMA encoded data within the system's allocated spectrum. Accordingly, for example, if three slots are allocated to CDMA encoded data, then CDMA encoder 408 would produce three spread data streams 436. In alternate embodiments, the ratio between spread data streams 436 and slots allocated to CDMA could be other than 1:1.

Multiplexer 414 receives the spread paging data streams 436 (i.e., the CDMA encoded data streams) and the processed voice data streams 442 (i.e., the non-spread data streams), and it performs multiplexing of the data. In one embodiment, multiplexer 414 receives the spread data streams 436 and the voice data streams 442 in parallel. In alternate embodiments, multiplexer 414 could receive some or all of the spread data streams 436 and/or the voice data streams 442 in a serial fashion. The number of connections shown from blocks 408 and 402 to block 414 are for ease of illustration. In practice, more or fewer connections could exist.

Referring also to FIG. 2 as an example, sixteen time/frequency slots (e.g., slots 220, 230, FIG. 2) are shown, with four timeslots 211–214 allocated to each frequency 201–204. Channel configuration processor 410 sets up the channel allocation configuration of multiplexer 414 based on acquisition information. Multiplexer 414 places segments of each data stream 436, 442 into the slot to which each is allocated. In one embodiment, the sixteen slots can be sequentially ordered for processing purposes, even though four at a time are transmitted at each of the four frequencies. Thus, the first four slots can be allocated to the first frequency, the fifth through eighth slots can be allocated to the second frequency, the ninth through twelfth slots can be allocated to the third frequency, and the thirteenth through sixteenth slots can be allocated to the fourth frequency. Thus, for example, if the paging data 436 is allocated to the third timeslot and the second frequency, multiplexer 414 can place segments of paging data 436 into the seventh timeslot.

In one embodiment, multiplexer 414 reserves a memory block for each timeslot, and multiplexer 414 fills the memory blocks with the data that will be sent out during each frame. Thus, for example, multiplexer 414 reserves sixteen memory blocks for the configuration shown in FIG. 2. In other embodiments, multiplexer 414 could reserve fewer memory blocks, or it could store data in various registers.

Multiplexer 414 sends the multiplexed data to frequency modulator 416. In one embodiment, multiplexer 414 produces one data stream 452 for each frequency. Thus, using the example allocation in FIG. 2, multiplexer 414 sends four data streams 452 to frequency modulator 416, where each data stream 452 corresponds to one frequency. For example, multiplexer 414 could send out the data in the first timeslot for all four frequencies at once, then send out the data in the second timeslot for all four frequencies, etc. Accordingly, using a matrix with four frequencies, four data streams 452 are sent to frequency modulator 416, and each stream 452 includes data in the first through fourth timeslots, sequentially, for the appropriate frequency. In other embodiments, the data could be transferred to frequency modulator 416 in a different manner. For example, all sixteen timeslots could be sent in parallel or serially, resulting in sixteen streams 452 or one stream 452, respectively. Other ways of transferring the multiplexed data to frequency modulator 416 would be obvious to one of skill in the art, based on the description herein. Thus, the number of connections shown between blocks 414 and 416 are for ease of illustration. In practice, more or fewer connections could exist.

Frequency modulator 416 modulates each of the data streams 452 to the appropriate frequencies to which they are allocated. Thus, for example, modulator 416 modulates each of the four data streams 452 to one of the four frequencies 201–204 (FIG. 2) in the spectral allocation. This results in a single modulated signal 454, which includes frequency modulated data for each of the timeslots in sequence.

In one embodiment, frequency modulator 416 modulates the data in baseband, and the modulated signal 454 is then upconverted, by upconverter 418, to some carrier frequency. In another embodiment, the modulations performed by frequency modulator 416 and upconverter 418 could be combined into one process.

The modulated, upconverted signal 456 is amplified, by amplifier 420, to a power level that is appropriate for the transmission medium. In prior art systems, as explained previously, it is necessary to amplify paging data to a higher power level than voice data, in order to achieve the required link margin for paging. Accordingly, different amplifiers are used, in some prior art systems, for the voice and paging data. Using the present invention, because the paging data is encoded using CDMA, it is not necessary to transmit the paging data at a higher power level in order to achieve the required link margin. Instead, the same amplifier 420 can be used for both the voice and paging data.

The amplified signal 458 is then converted to a wireless signal 460 via antenna 422. Antenna 422 could be a phased array, directional, omnidirectional, or other type of antenna, in various embodiments.

Figure 5:
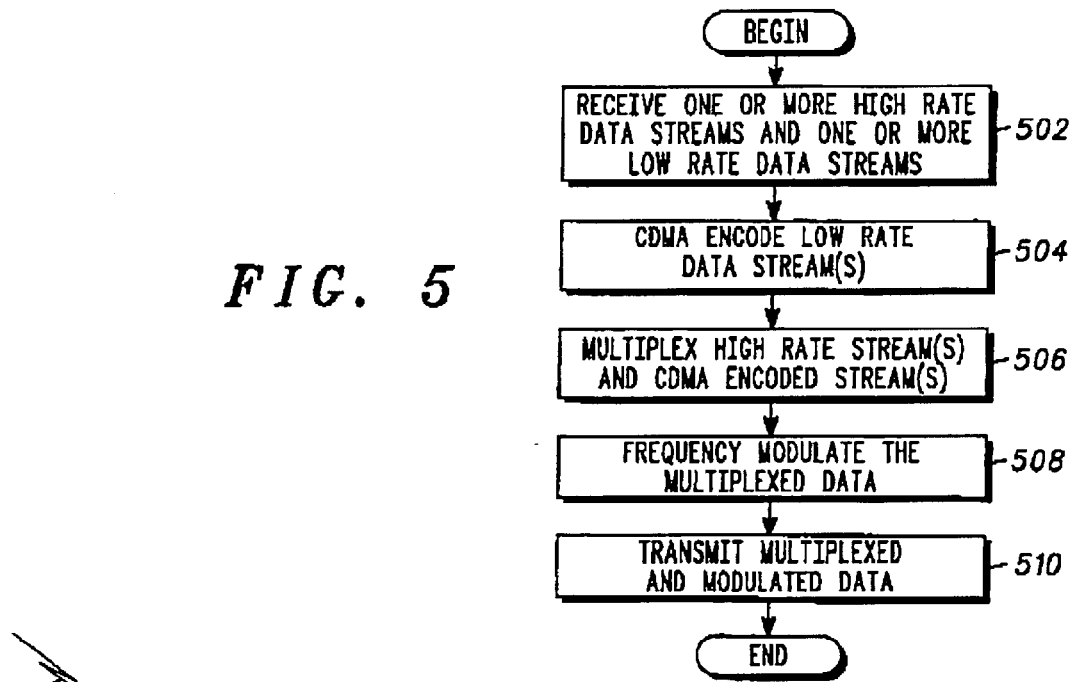
FIG. 5 illustrates a flowchart of a method for a transmitter to provide high rate and low rate wireless communication services in accordance with one embodiment of the present invention.

FIG. 5 illustrates a flowchart of a method for a transmitter within a communication system to provide high rate and low rate wireless communication services in accordance with one embodiment of the present invention. The method is performed by a system node responsible for multiplexing multiple data streams. Thus, for example, the method could be performed by a satellite (e.g., satellite 302, FIG. 3), by a cellular base station, or by another similarly functioning type of system node. In other embodiments, the method could be performed by a communication unit (e.g., communication equipment 304, FIG. 3) or another system component.

The method begins, in block 502, by receiving one or more high rate data streams and one or more low rate data streams. In one embodiment, the high rate data streams include voice data, and the low rate data streams include paging data. In other embodiments, either or both the high or low rate data streams could include different types of data.

In block 504, the one or more low rate data streams are encoded using CDMA, resulting in one or more spread data streams. Encoding the low rate data streams involves encoding a single data stream at a frequency, or encoding multiple streams together at the sane frequency.

As described previously, the selected chip rate used to encode the low rate data streams, in one embodiment, results in a higher link margin for the low rate data. Also, in one embodiment, the chip rate could be determined by a user (e.g., during an acquisition process). In an alternate embodiment, the chip rate could be determined or pre-set by the communication system. Finally, the chip rate could be changed, in one embodiment, if the characteristics of the link change, which would allow continuous optimization of the link.

Next, each of the high rate data streams and the spread data streams are multiplexed, in block 506, resulting in one or more multiplexed data streams. The multiplexed data streams are then frequency modulated, in block 508, to one or more frequencies that are available to the system. This process results in a modulated data stream. In one embodiment, the transmitter has knowledge of which time/frequency slots should include CDMA encoded data, and which should not, and the transmitter multiplexes and modulates the data accordingly.

In one embodiment, the high rate and CDMA encoded data streams are multiplexed and/or modulated into adjacent time and/or frequency slots. In other words, the process of multiplexing and frequency modulating involves placing at least one of the spread data streams into the same timeslot but at a different frequency from one or more of the high rate data streams. Alternatively, or in addition, at least one of the spread data streams could be placed into a different timeslot but at the same frequency as one or more of the high rate data streams.

The modulated data stream is then transmitted, in block 510. In one embodiment, the data stream is transmitted at a single power level, enabling the same hardware to transmit all of the data. In another embodiment, data within different timeslots and/or at different frequencies could be transmitted at various power levels. Prior to transmission, various processes could be applied to the data stream (e.g., upconversion and/or amplification). These processes are not described in detail here, as they are well known and would be obvious to one of skill in the art. After transmission, the method ends.

Referring back to FIG. 3, the modulated data steam transmitted by the transmitter is received by a communication device (e.g., communication equipment 304 or control center 310, FIG. 3). The communication device looks in the proper time and frequency slot to complete the communication link. If the data is relatively low rate data, the communication device then applies the correct spreading code to recover the data.

Likewise, in the return link, the communication device transmits data to a system node (e.g., satellite 302, FIG. 3) in the allocated time and frequency slot. If the data is relatively low rate data, a spreading code is applied. The RF energy from multiple communication devices is simultaneously received by a receiver on board the system node.

Figure 6:
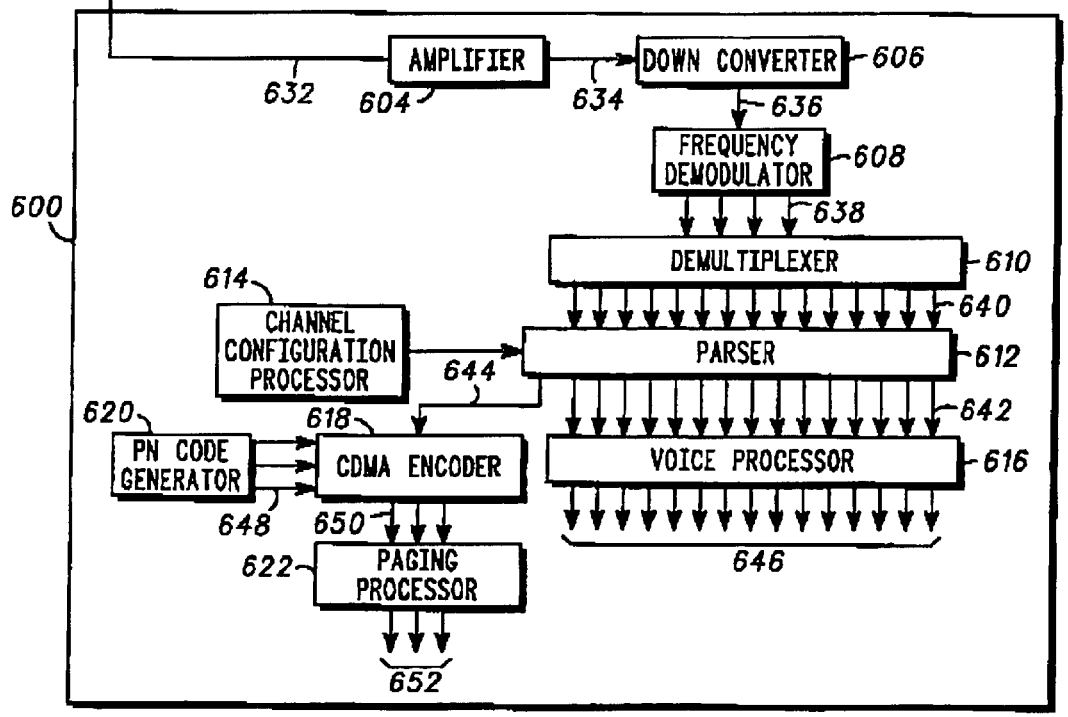
FIG. 6 illustrates a simplified block diagram of a receiver in accordance with one embodiment of the present invention.

FIG. 6 illustrates a simplified block diagram of a receiver 600 in accordance with one embodiment of the present invention. Receiver 600 resides on a system node responsible for demultiplexing data streams. Thus, for example, receiver 600 could be located onboard a satellite (e.g., satellite 302, FIG. 3), within a cellular base station, or in another similarly functioning type of system node. In other embodiments, receiver 600 could be located within a communication unit (e.g., as, communication equipment 304, FIG. 3) or another system component.

In one embodiment, receiver 600 includes antenna 602, amplifier 604, downconverter 606, frequency demodulator 608, demultiplexer 610, parser 612, channel configuration processor 614, voice processor 616, CDMA decoder 618, PN code generator 620, and paging processor 622. Receiver 600 receives one or more RF multiplexed signals 630 over a wireless transmission medium. For example, signal 630 could be in a format such as the signal 460 (FIG. 4) produced by transmitter 400, where at least one slot includes CDMA encoded data.

Antenna 602 converts the RF signal 630 to an electronic format 632, and that signal 632 is amplified by amplifier 604. The amplified signal 634 is then downconverted to baseband by downconverter 606. The downconverted bitstream 636 is sent to frequency demodulator 608.

Frequency demodulator 608 demodulates the baseband data by converting the data within each of the allocated frequencies to one or more multiplexed data streams, each at the same frequency. Frequency demodulator 608 sends the multiplexed data to demultiplexer 610.

In one embodiment, demodulator 608 produces one data stream 638 for each frequency. Thus, using the example allocation in FIG. 2, demodulator 608 produces and sends four data streams 638 to demultiplexer 610, where each data stream 638 corresponds to one frequency. For example, demodulator 608 would send out the data in the first timeslot for all four frequencies at once, then send out the data in the second timeslot for all four frequencies, etc. Accordingly, using a matrix with four frequencies, four data streams 638 would be sent to demultiplexer 610, and each stream 638 would include data in the first through fourth timeslots, sequentially, for the appropriate frequency.

In other embodiments, the data could be transferred to demultiplexer 610 in a different manner. For example, all sixteen timeslots could be sent in parallel or serially, resulting in sixteen streams or one stream, respectively. Other ways of transferring the multiplexed data to demultiplexer 610 would be obvious to one of skill in the art, based on the description herein. Thus, the number of connections shown between blocks 608 and 610 are for ease of illustration. In practice, more or fewer connections could exist.

Demultiplexer 610 receives the demodulated data streams 638, and it performs demultiplexing of the data. In one embodiment, demultiplexer 610 reserves a memory block for each timeslot, and demultiplexer 610 fills the memory blocks with the data that is received during each frame. Thus, for example, demultiplexer 610 would reserve sixteen memory blocks for the configuration shown in FIG. 2. In other embodiments, demultiplexer 610 could reserve fewer memory blocks, or it could store data in various registers. Referring to FIG. 2 as an example, sixteen time/frequency slots (e.g., slots 220, 230, FIG. 2) are shown, with four timeslots 211–214 allocated to each frequency 201–204. Demultiplexer 610 receives the first timeslot of data in demodulated streams 638 for each of the four frequencies, and it places the data within each timeslot of received data into the slot (e.g., the memory block) to which each is allocated.

In one embodiment, the sixteen slots could be sequentially ordered, even though four at a time would be received at each of the four frequencies. Thus, the first four slots could be allocated to the first frequency, the fifth through eighth slots could be allocated to the second frequency, the ninth through twelfth slots could be allocated to the third frequency, and the thirteenth through sixteenth slots could be allocated to the fourth frequency. When demultiplexer 610 receives the first timeslot of data for each of the four frequencies, demultiplexer 6.10 would place the received data into the first, fifth, ninth, and thirteenth slots. Then, when the second timeslot of data is received, demultiplexer 610 would place the received data into the second, sixth, tenth, and fourteenth slots, etc.

Demultiplexer 610 essentially separates out data from the multiplexed streams, and it produces contiguous data streams 640. In one embodiment, the data streams 640 include one or more spread paging data streams and one or more voice data streams. In one embodiment, demultiplexer 610 sends these data streams 640 to parser 612 in parallel. In alternate embodiments, demultiplexer 610 could send some or all of the data streams 640 in a serial fashion. The number of connections shown between blocks 610 and 612 are for ease of illustration. In practice, more or fewer connections could exist.

Parser 612 receives the demodulated, demultiplexed data streams 640, and it sends each stream 642, 644 either to voice processor 616 or CDMA decoder 618, respectively. Channel configuration processor 614 sets up the channel allocation configuration of parser 612 based on acquisition information, which indicates which streams are CDMA encoded, and which are not.

In one embodiment, parser 612 sends these data streams 642, 644 to voice processor 616 and CDMA decoder 618 in parallel. In alternate embodiments, parser 612 could send some or all of the data streams 642, 644 in a serial fashion. The number of connections shown between blocks 612 and 614 are for ease of illustration. In practice, more or fewer connections could exist.

Although FIG. 6 shows fifteen voice data streams 642 and one paging data stream 644 being sent to voice processor 616 and CDMA decoder 618, respectively, more or fewer voice streams 642 and paging streams 644 could be sent to processor 616 and decoder 618. In one embodiment, the number of voice data streams 642 corresponds to the number of slots (e.g., slot 220, FIG. 2) allocated to voice data within the system's allocated spectrum, and the number of paging data streams 644 corresponds to the number of slots (e.g., slot 230, FIG. 2) allocated to paging data. Accordingly, for example, if nine slots are allocated to voice data and three slots are allocated to paging data, then parser 612 would produce nine voice data streams 642 and three paging data streams 644. In alternate embodiments, the ratio between voice data streams 642 and paging data streams 644 and allocated slots 220, 230 (FIG. 2) could be other than 1:1.

Parser 612 sends the streams 642 that are not CDMA encoded (i.e., the non-spread streams) to voice processor 616. Voice processor 616 prepares the voice data streams 642 for retransmission or consumption, resulting in processed voice data streams 646. Depending on the format of the voice data when it will be retransmitted or consumed, this could involve amplification, upconversion, multiplexing, modulation, reformatting, and/or demodulation.

Parser 612 sends the streams 644 that are CDMA encoded (i.e., the spread streams) to CDMA decoder 618. CDMA decoder 618 receives the paging data stream 644 (or streams), and it applies one or more orthogonal spreading codes 648 to each of the paging data streams 644, depending on how many paging signals are spread into each data stream 644. The spreading codes 648 for each stream 644 are generated by PN code generator 620, in one embodiment, using techniques that are well known to those of skill in the art.

CDMA decoder 618 then separates the despread data, resulting in a despread data stream 650 for each paging signal. The despread data streams 650 are sent to paging processor 622, which will be described below. Although FIG. 4 shows three paging data streams 650 being separated out of one spread data stream 644, more or fewer paging streams 650 could be separated out of one or more spread data streams 644.

Paging processor 622 prepares the paging data streams 650 for retransmission or consumption, resulting in processed paging data streams 652. Depending on the format of the paging data when it is retransmitted or consumed, this could involve amplification, upconversion, multiplexing, encoding, modulation, reformatting, and/or demodulation.

Figure 7:
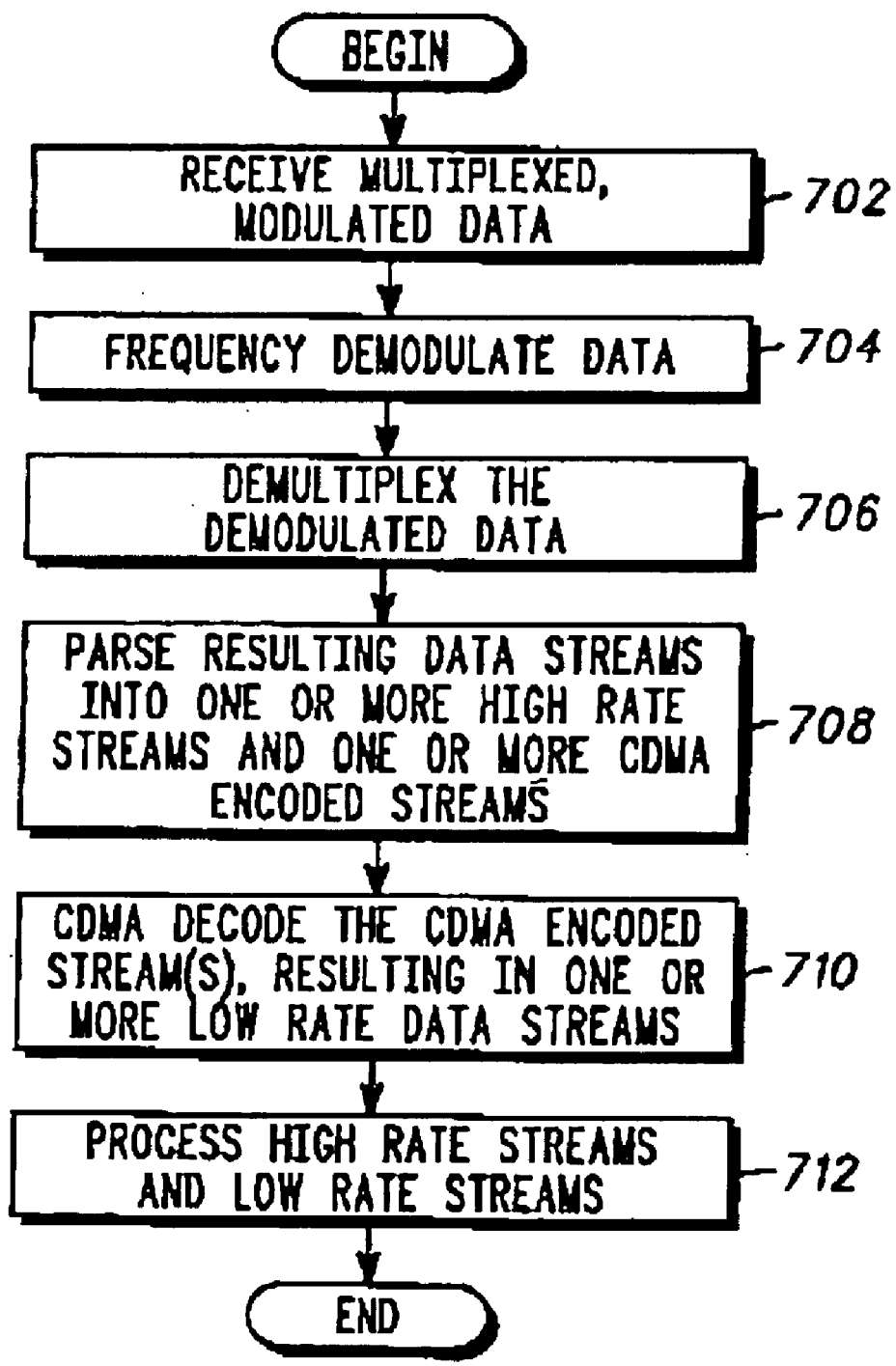
FIG. 7 illustrates a flowchart of a method for a receiver to provide high rate and low rate wireless communication services in accordance with one embodiment of the present invention.

FIG. 7 illustrates a flowchart of a method for a receiver within a communication system to provide high rate and low rate wireless communication services in accordance with one embodiment of the present invention. The method is performed by a system node responsible for demultiplexing multiple data streams. Thus, for example, the method could be performed by a satellite (e.g., satellite 302, FIG. 3), by a cellular base station, or by another similarly functioning type of system node. In other embodiments, the method could be performed by a communication unit (e.g., communication equipment 304, FIG. 3) or another system component.

The method begins, in block 702, by receiving a data stream of multiplexed and modulated data. In one embodiment, the data is received after it was transmitted by a transmitter at a single power level. In other embodiments, the data could have been transmitted at multiple power levels. Upon receipt, various processes could be applied to the data stream (e.g., downconversion and/or amplification). These processes are not described in detail here, as they are well known and would be obvious to one of skill in the art.

Next, the data stream is frequency demodulated, in block 704, resulting in one or more multiplexed data streams being separated out of one or more frequencies that are available to the system. Each of the multiplexed data streams is then demultiplexed, in block 706, resulting in one or more high rate data streams and one or more spread data streams.

In one embodiment, the high rate and encoded data streams are demultiplexed and/or demodulated out of adjacent timeslots and/or frequencies. In other words, the process of demultiplexing and frequency demodulating involves separating at least one of the spread data streams out of the same timeslot but from a different frequency from one or more of the high rate data streams. Alternatively, or in addition, at least one of the spread data streams could be separated out of a different timeslot but at the same frequency as one or more of the high rate data streams.

In block 708, the data streams resulting from the demodulation and demultiplexing processes are parsed into one or more high rate streams and one or more CDMA encoded streams. In one embodiment, the receiver has knowledge of which time/frequency slots include CDMA encoded data, and which do not, and the receiver parses the data accordingly.

In block 710, the one or more CDMA encoded data streams are decoded using CDMA, resulting in one or more low rate data streams. Decoding the CDMA encoded data streams involves decoding a single data stream out of a frequency band, or decoding multiple streams out of the same frequency band.

As described previously, the chip rate used to decode the CDMA encoded data streams is chosen, in one embodiment, to result in a higher link margin for the low rate data than the link margin for the high rate data. Also, in one embodiment, the chip rate could be determined by a user (e.g., during an acquisition process). In an alternate embodiment, the chip rate could be determined or pre-set by the communication system.

In block 712, the high rate data streams and the low rate data streams are processed according to their data types. After processing, the method ends.

The methods and apparatus of the various embodiments of the present invention have several advantages. First, the paging and voice slots can be interspersed, resulting in a more efficient use of available spectrum. Second, the same hardware can be used to amplify and transmit both voice and paging data, while effectively increasing the link margin of the paging data. In addition, because CDMA is used to encode the paging data, multiple paging streams can be encoded, multiplexed, and modulated into the same time/frequency slot. Thus, more paging capacity is possible using the method and apparatus of the present invention.

In the foregoing detailed description, reference is made to the accompanying drawings, which form a part hereof, and in which are shown by way of illustration specific embodiments in which the invention may be practiced. These embodiments are described in sufficient detail to enable those skilled in the art to practice the invention. The foregoing detailed description uses terms that are provided in order to make the detailed description more easily understandable. It is to be understood that these terms and the phraseology employed in the description should not be construed to limit the scope of the invention.

It will be understood by those skilled in the art that the operations of the methods shown and described herein can be carried out in a different order than those described with reference to the drawings. It will be further understood that the various elements illustrated in the drawings are merely representational and are not drawn to scale. Certain proportions thereof may be exaggerated, while others may be minimized. The drawings are intended to illustrate various implementations of the invention, which can be understood and appropriately carried out by those of ordinary skill in the art.

It will be appreciated by those of ordinary skill in the art that any arrangement, which is calculated to achieve the same purpose, may be substituted for the specific embodiment shown. For example, although the description refers to voice channels and paging channels as being examples of relatively high and low bit rate channels, respectively, the method and apparatus of the present invention could be used in conjunction with other types of data as well. In addition, although only two services having relatively high and low bit rates are described, other services also could be allocated some of the frequencies and timeslots within the available spectrum. These other services could have the same or different bit rates as the relatively high and low bit rate services. The methods and apparatus of the present invention can be implemented in a system that receives and transmits any number of data streams, each of which may, if desired, have its own information rate and link margin.

In addition, although certain numbers of connections are shown between various processing blocks, indicating parallel and/or serial transfer of certain numbers of data streams, more or fewer connections could also be used between the processing blocks, where some data is transmitted serially and/or in parallel. Finally, although the method and apparatus are described in the context of a satellite communication system, they also could be implemented in a terrestrial system, a space based system, or a hybrid system.

This application is intended to cover any adaptations or variations of the present invention that fall within its scope. The foregoing detailed description, therefore, is not to be taken in a limiting sense, and it will be readily understood by those skilled in the art that various changes in the details, materials, and arrangements of the parts and operations which have been described and illustrated in order to explain the nature of this invention may be made without departing from the spirit and scope of the invention as expressed in the adjoining claims.

What is claimed is:

1. A method in a communication system for providing multiple wireless communication services having different bit rates, the method comprising:
   receiving one or more first data streams, each having a first information bit rate;
   receiving one or more second data streams, each having a second information bit rate that is higher than the first information bit rate;
   encoding the one or more first data streams using code division multiple access (CDMA), resulting in one or more spread data streams;
   multiplexing each of the one or more second data streams and the one or more spread data streams, resulting in one or more multiplexed data stream;
   frequency modulating the one or more multiplexed data streams, resulting in a modulated data stream; and
   transmitting the modulated data stream at a first power level, wherein the one or more first data streams and the one or more second data streams have a common transmission bit rate, resulting in differences in link margin for the one or more first data streams and the one or more second data streams.

2. The method as claimed in claim 1, wherein multiplexing comprises multiplexing at least one of the one or more spread data streams into a same timeslot as at least one of the one or more second data streams, and frequency modulating comprises modulating the at least one of the one or more spread data streams into a different frequency as the at least one of the one or more second data streams.

3. The method as claimed in claim 1, wherein multiplexing comprises multiplexing at least one of the one or more spread data streams into a different timeslot as at least one of the one or more second data streams, and frequency modulating comprises modulating the at least one of the one or more spread data streams into a same frequency at the at least one of the one or more second data streams.

4. The method as claimed in claim 1, wherein receiving the one or more fist data streams comprises receiving one or more paging data streams.

5. The method as claimed in claim 1, wherein receiving the one or more second data streams comprises receiving one or more voice data streams.

6. The method as claimed in claim 1, wherein encoding the one or more fit data streams comprises encoding multiple streams of the one or more first data streams together within a same frequency band.

7. The method as claimed in claim 1, wherein encoding the one or more first data streams comprises encoding using a chip rate that results in a higher link margin than a link margin for the one or more second data streams.

8. The method as claimed in claim 7, wherein the chip rate is determined by a user of the communication system.

9. A method in a communication system for providing multiple wireless communication services having different bit rates, the method comprising:

receiving a modulated data steam;

frequency demodulating the modulated data stream, resulting in one or more multiplexed data streams;

demultiplexing the one or more multiplexed data streams, resulting in one or more non-spread data streams and one or more spread data streams, wherein the one or more non-spread data streams have a first bit rate;

decoding the one or more spread data streams out of a same frequency band using code division multiple access (CDMA), resulting in one or more decoded data streams, wherein the one or more decoded data streams have a second bit rate that is lower than the first bit rate; and processing the one or more non-spread data streams and the one or more decoded data streams; and the frequency demodulating comprises demodulating least one of the one or more spread data streams out of a different frequency from at least one of the one or more non-spread data streams, and demultiplexing comprises demultiplexing at least one of the one or more spread data streams out of a same timeslot as at least one of the one or more non-spread data streams.

10. The method as claimed in claim 9, wherein decoding comprises decoding using a chip rate that results in a higher link margin for the one or more decoded data streams than a link margin for the one or more non-spread data streams.

11. The method as claimed in claim 10, wherein the chip rate is determined by a user of the communication system.

* * * * *